United States Patent Office
3,780,049
Patented Dec. 18, 1973

3,780,049
NICKEL COMPLEXES OF DIOXIMES AND
PROCESSES FOR THEIR MANUFACTURE
Stefan Hari, Allschwil, and Karl Ronco, Riehen, Switzerland, assignors to Ciba-Geigy AG, Basel, Switzerland
No Drawing. Filed July 7, 1971, Ser. No. 160,562
Claims priority, application Switzerland, July 27, 1970,
11,325/70
Int. Cl. C07d 91/44
U.S. Cl. 260—299         2 Claims

ABSTRACT OF THE DISCLOSURE

Nickel complexes of dioximes of the formula

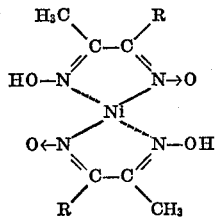

wherein R denotes a heterocyclic radical are useful for coloring plastics and lacquers in fast yellow shades.

---

It has been found that new nickel complexes of dioximes of the formula

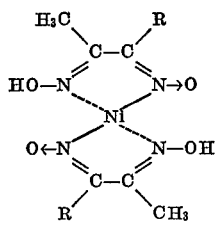

wherein R denotes a heterocyclic radical, are obtained if a dioxime of the formula

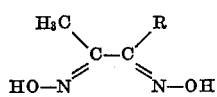

wherein R has the indicated meaning, is treated with nickel-donating agents.

A preferred class of nickel complexes is of the formula

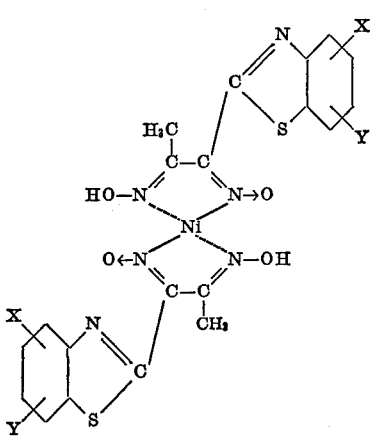

wherein X and Y represent H- or halogen atoms, alkyl or alkoxy group having 1–4 C-atoms.

It is preferred to start from dioximes of the formula

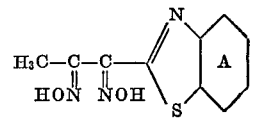

wherein A denotes an optionally substituted phenylene radical.

The dioximes to be used as starting substances can be obtained according to processes which are in themselves known, by nitrosylation of the corresponding ketone and reaction of the oximinoketone thus obtained with hydroxylamine.

For the metallisation of the dioximes, the nickel-donating agents used are preferably the nickel salts, especially nickel chloride or nickel sulphate, but especially the nickel salts of the lower fatty acids, for example nickel propionate, but preferably nickel acetate. It is desirable to use a slight excess, for example up to 50%, over the theoretical requirement of 1 mol of the nickel salt per 2 mols of the dioxime.

The metallisation is appropriately carried out in a water-miscible organic solvent, for example a lower aliphatic alcohol, such as methanol, ethanol, propanol or isopropanol, at room temperature or a slightly raised temperature. Dimethylformamide, glacial acetic acid, dimethylsulphoxide or ethylene glycol monoethyl ether may be mentioned as further suitable solvents. When using salts of nickel with mineral acids, the process is appropriately carried out in the presence of an acid-binding agent, for example an alkali hydroxide or alkali carbonate, or of tertiary bases, such as pyridine.

Since the nickel complexes obtained are insoluble in the reaction medium, they can easily be isolated by filtration. To remove excess nickel salts, it is advisable to wash the precipitate.

The new nickel complexes are valuable pigments, which in a finely divided form can be used for pigmenting high molecular organic material, for example cellulose ethers and cellulose esters, polyamides or polyurethanes or polyesters, acetylcellulose, nitrocellulose, natural resins or synthetic resins, for example aminoplasts, especially urea-formaldehyde and melamine-formaldehyde resins, alkyd resins, phenoplasts, polycarbonates, polyolefines, such as polystyrene, polyvinyl chloride, polyethylene, polypropylene, polyacrylonitrile and polyacrylic acid esters, rubber, casein, silicone and silicone resins, individually or as mixtures. It is immaterial whether the high molecular compounds mentioned are in the form of plastic masses or melts, or in the form of spinning solutions, lacquers or printing inks. Depending on the end use, it proves advantageous to employ the new pigments as toners or in the form of preparations. The new pigments are distinguished by high fastness properties, especially by excellent fastness to light and to migration.

The dyestuffs according to the invention are distinguished, relative to the dyestuff described in British patent specification No. 1,190,051, by better fastness to light and to migration.

In the examples which follow the parts, unless otherwise stated, denote parts by weight and the percentages denote percentages by weight.

EXAMPLE (a) 1-(2-benzthiazolyl)-1-oximino-propanone-(2)

9.6 parts of 1-(2-benzthiazolyl)-propanone-(2), 3 parts of sodium hydroxide and 4.5 parts of sodium nitrite are dissolved in 38 parts of water at room temperature and added dropwise at 4 to 8° C., and over the course of 30 minutes, to a solution of 15 parts by volume of 98% strength sulphuric acid and 135 parts of water. The resulting slurry is stirred for a further 30 minutes at 4 to 8° C., filtered off, washed until neutral and dried in vacuo at 60° C. 10.6 parts (96.5% of theory) of the abovementioned oxime, melting at 145° C., are obtained.

The 1-(2-benzthiazolyl)-propanone-(2) used as the starting material can be manufactured as follows:

32 parts of 2-amino-thiophenol and 21 parts of anhydrous sodium carbonate are stirred into 150 parts of water and treated dropwise, over the course of 30 minutes, with 21 parts of diketene, in the course of which the temperature rises to 43° C.; the mixture is left to stand for 16 hours. The yellow liquid is thereafter decanted from the sticky mass, filtered and acidified with 100 parts by volume of 10% strength hydrochloric acid solution. Hereupon, a sticky substance precipitates, which solidifies after brief standing. It is thereafter briefly worked into a slurry in a mixer, filtered off, washed with 300 parts of icewater until neutral, and dried over calcium chloride in a vacuum desiccator. 35 parts (73% of theory) of 2-acetonyl-benzthiazole are obtained as a light yellow powder of melting point 100 to 104° C. When recrystallised from alcohol, the product melts at 114 to 116° C.

Analysis.—Found (percent): C, 62.8; H, 4.6; N, 7.2; S, 16.8. Calculated (percent): C, 62.80; H, 4.74; N, 7.32; S, 16.77.

(b) 1-(2-benzthiazolyl)-1,2-dioximino-propane 10.3 parts of 1-(2-benzthiazolyl)-1-oximino-propanone-(2) are suspended in 25 parts by volume of alcohol at room temperature, mixed with a solution of 5.1 parts of hydroxylamine hydrochloride and 5.1 parts of sodium acetate in 15 parts of water, and warmed to 70° C. The mixture is stirred for 10 minutes at this temperature and is then stirred for a further hour until the temperature has dropped to 40° C. It is then left to cool to 5° C. The precipitate obtained is filtered off, washed until neutral and dried in vacuo at 60° C. The yield is 10.1 parts, corresponding to 86% of theory. The product melts at 184 to 185° C.

(c) Manufacture of the nickel complex 2.35 parts of 1-(2-benzthiazolyl)-1,2-dioximino-propane in 50 parts by volume of methanol are stirred with a solution of 1.25 parts of nickel acetate tetrahydrate in 8.2 parts of water for 5 hours at 50° C. The product is then filtered off hot, washed with methanol and hot water, and dried. 2.5 parts (95.5% of theory) of an orange-coloured pigment powder of the formula

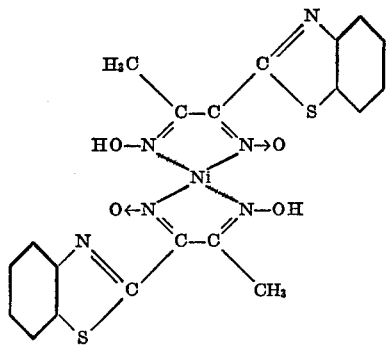

are obtained, which dyes polyvinyl chloride in orange shades of very good fastness to light and to migration.

Analysis.—Found (percent): C, 45.9; H, 3.3; N, 16.2; S, 11.9. Calculated (percent): C, 45.56; H, 3.06; N, 15.94; S, 12.16.

DYEING INSTRUCTION 65 parts of stabilised polyvinyl chloride, 35 parts of dioctyl phthalate and 0.2 part of the dyestuff obtained according to Example 1 are stirred with one another and are then milled on a two-roll calender for 7 minutes at 140° C. An orange-coloured film of very good fastness to light and to migration is obtained.

What we claim is:

1. A nickel complex of the dioxime of the formula

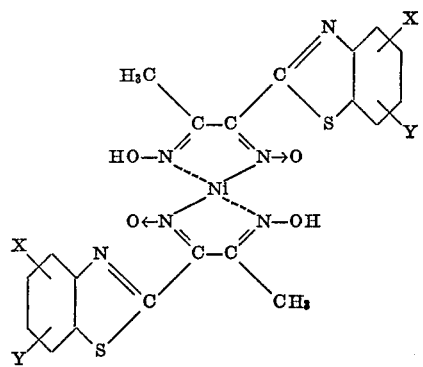

wherein X and Y represent H- or halogen atoms, alkyl or alkoxy group having 1–4 C-atoms.

2. The compound of the formula

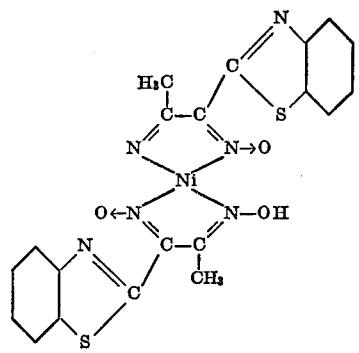

References Cited

UNITED STATES PATENTS 3,682,923    8/1972    Hiller et al. ‑‑‑‑‑‑‑‑‑‑ 260—299

RICHARD J. GALLAGHER, Primary Examiner

U.S. Cl. X.R.

260—41; 264—175